J. B. WHITE.
AGRICULTURAL IMPLEMENT.
APPLICATION FILED OCT. 6, 1916.
1,228,273.
Patented May 29, 1917.
2 SHEETS—SHEET 1.
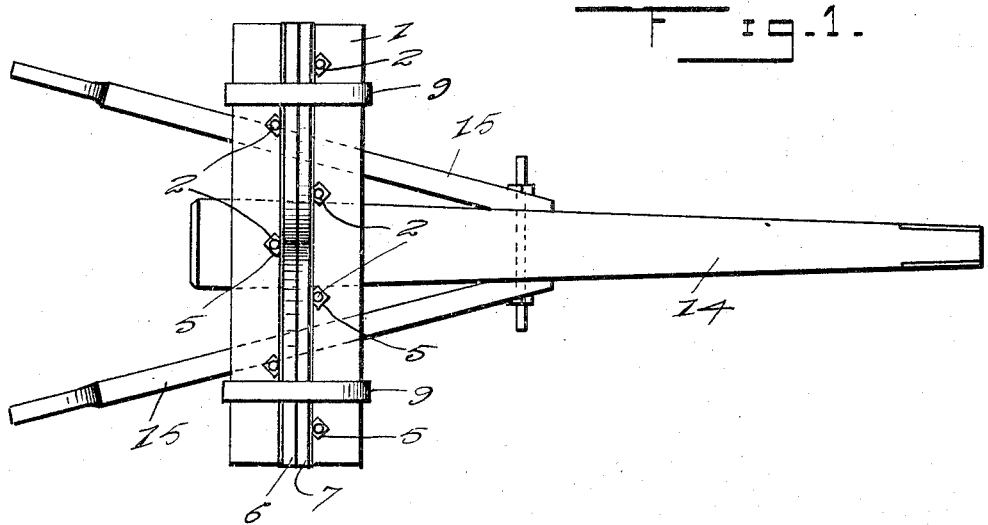
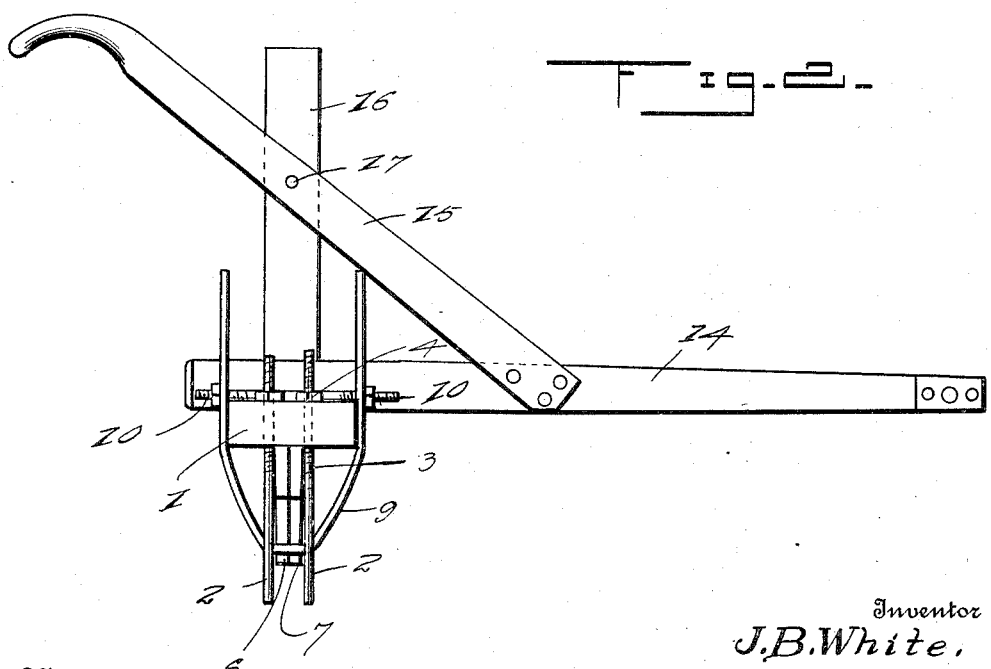
Witnesses
O. R. Bealle
Robt Meyer
Inventor
J. B. White,
By [signature], Attorney J. B. WHITE.
AGRICULTURAL IMPLEMENT.
APPLICATION FILED OCT. 6, 1916.
1,228,273.
Patented May 29, 1917.
2 SHEETS—SHEET 2.
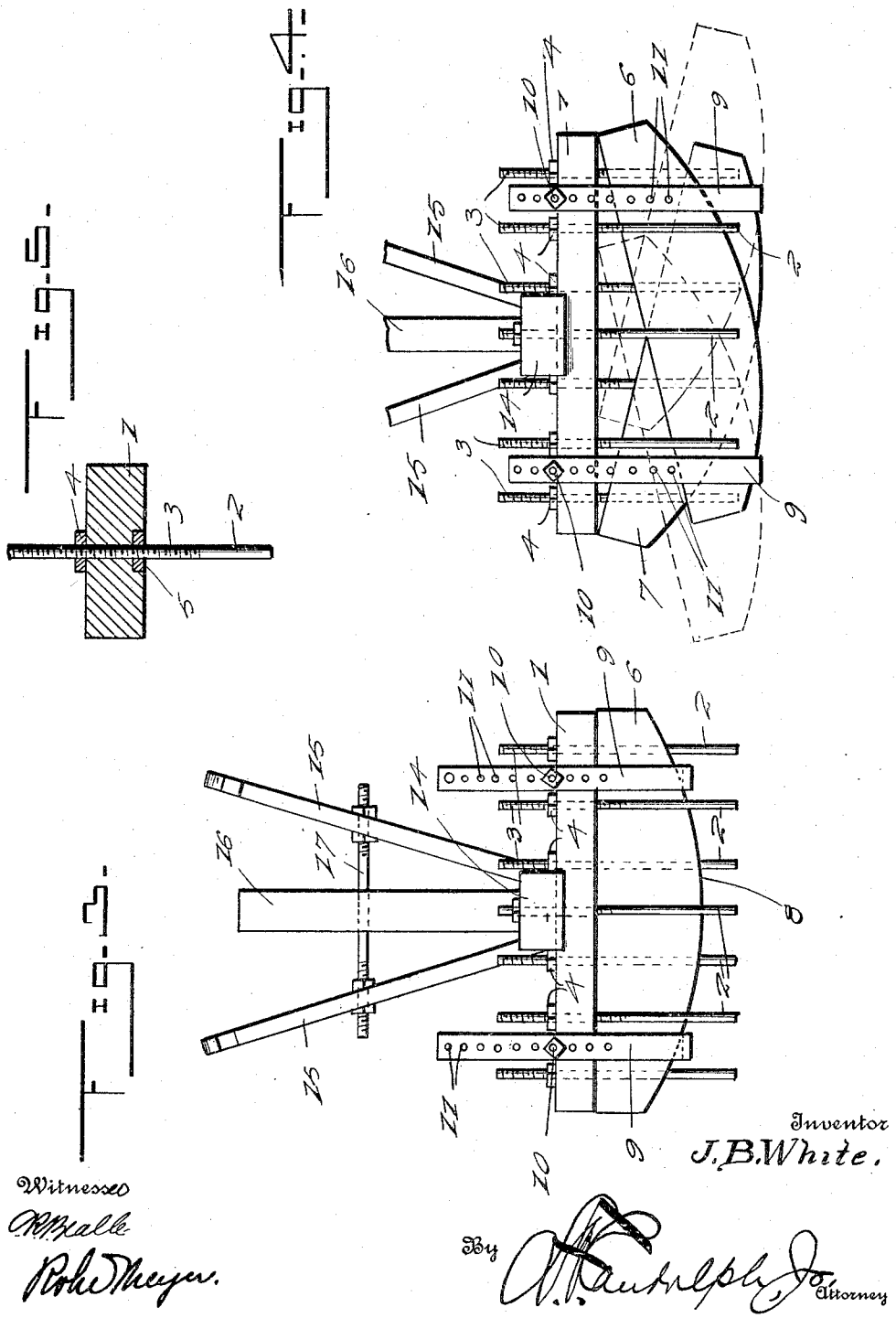
Inventor
J. B. White.
Witnesses
By
Attorney

UNITED STATES PATENT OFFICE.

JAMES B. WHITE, OF BOLIVAR, TENNESSEE.

AGRICULTURAL IMPLEMENT.

1,228,273.

Specification of Letters Patent.

Patented May 29, 1917.

Application filed October 6, 1916. Serial No. 124,058.

*To all whom it may concern:*

Be it known that I, JAMES B. WHITE, a citizen of the United States, residing at Bolivar, in the county of Hardeman and State of Tennessee, have invented certain new and useful Improvements in Agricultural Implements; and I do hereby declare the following to be a full, clear, and exact description of the invention, such as will enable others skilled in the art to which it appertains to make and use the same.

This invention relates to an agricultural implement and the primary object of the invention is to provide an implement which is constructed so that it may be used either as a harrow or a drag, for cultivating growing grain, or for preparing a seed bed prior to planting grain in the same.

Another object of this invention is to provide an agricultural implement as specified which includes a main body plate having a plurality of harrowing teeth adjustably connected thereto and to mount a pair of drag plates between a pair of spacing rows of the harrowing teeth and hold the drag plates in either an operative or inoperative position by means of metallic straps which extend across the lower edges of the plates, along the side edges of the body plates and which are held in firm engagement with the plates and body plates by means of removable and adjustable pins.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a bottom plan view of the improved implement,

Fig. 2 is a side elevation of the implement showing the same adjusted for use as a harrow, Fig. 3 is a rear elevation of the implement showing the same adjusted for use as a harrow, Fig. 4 is a rear elevation of the implement showing the drag blades in an operative position for dragging ground, and Fig. 5 is a fragmentary section through the body plates showing the manner of adjusting the harrow teeth.

Referring more particularly to the drawings, 1 designates the body plate of the implement which is preferably rectangular shaped and which has a plurality of harrowing teeth 2 carried thereby. The teeth 2 are arranged in rows, so that the teeth in one row are disposed staggeredly with respect to the teeth in the row next thereto, as clearly shown in Figs. 1 and 3 of the drawings.

The teeth 2 have their upper ends externally screw threaded as indicated at 3, and nuts 4 and 5 are mounted upon each tooth, for holding it in various adjusted positions. The vertical adjustment of the teeth 2, with respect to the bar 1 is provided for regulating the length of the portions of the teeth which project beneath the body plate and also for regulating the depth of the insertion of the teeth into the ground over which the implement is passing.

A pair of drag blades 6 and 7 are provided which are positioned between the rows of harrowing teeth 2. The blades 6 and 7 have their lower edges curved as indicated at 8. Metallic straps 9 are provided which extend across the lower edges of the plates 6 and 7 adjacent to their ends, upwardly along each of the side edges of the body 1, and upwardly therefrom as clearly shown in Figs. 2 and 3 of the drawings. Bolts or pins 10 extend across the upper surface of the body plate 1 and through any one of a series of openings 11 which are formed in the straps 9, for securely clamping the plates 6 and 7 in their respective position.

In Fig. 3 of the drawings, the drag plates 6 and 7 are illustrated as having their upper edges lying in facial abutment with the under surface of the body plate 1, and their lower edges positioned upwardly of the lower ends of the harrowing teeth 2, which is the position of the blades when the implement is employed as a harrow.

When it is desired to drag ground in lieu of harrowing the same, the blades 6 and 7 are tilted into the position indicated in Fig. 4 so that their upper corners engage the lower or under surface of the body plate 1, and their lower corners are positioned a short distance above the lowermost portion of the lower edges of the blades, providing a substantially straight edge which engages the ground over which the implement is dragged. If it is so desired, the blades 6 and 7 may be extended so that their ends will project beyond the ends of the body plate 1 as indicated in dotted lines in Fig. 4 of the drawings for increasing the dragging stroke of the implement.

The body plate 1 has a tongue 14 of any ordinary desired construction attached to the upper surface of the same and projecting forwardly therefrom. Handles 15 of the usual construction are attached to the tongue 14 and to an upright or standard 16 which is attached to the upper surface of the body plate 1 substantially equidistant of its ends. A suitable brace pin or bolt 17 is employed for connecting the handles 15 to the standard 16.

In reducing the invention to practice, certain minor features of construction, combination and arrangement of parts may necessitate alterations to which the patentee is entitled provided such alterations are comprehended within the scope of what is claimed.

What is claimed is:—

1. In an agricultural implement structure, the combination of a body bar, and a plurality of harrow teeth carried by said body bar and arranged in rows, the teeth in one row being disposed staggeredly with respect to the teeth in the row next thereto and a pair of drag plates adjustably connected to said body bar, and positioned between the rows of said harrowing teeth.

2. In an agricultural implement structure, the combination of a body plate, a plurality of harrowing teeth carried by said body plate and arranged in rows, a pair of drag plates positioned between the rows of harrowing teeth and adapted for movement into and out of an operative dragging position, and means for engaging the lower edges of said drag plates and said body plate for holding said drag plates in various adjusted positions.

3. In an agricultural implement structure, the combination of a body plate, a plurality of harrowing teeth carried by said body plate and arranged in rows, a pair of drag plates positioned between said rows of teeth, said drag plates having their lower edges curved, metallic straps engaging the lower curved edges of said drag plates adjacent to their outer ends, pins adjustably connected to said straps and engaging said body plate for holding said drag plates in adjusted position with respect to the body plate and said harrowing teeth.

4. In an agricultural implement structure, the combination of a body plate, a plurality of harrowing teeth carried by said body plate and arranged in rows, a pair of drag plates positioned between said rows of teeth, said drag plates having their lower edges curved, metallic straps engaging the lower curved edges of said drag plates adjacent to their outer ends, pins adjustably connected to said straps and engaging said body plate for holding said drag plates in adjusted position with respect to the body plate and said harrowing teeth, a tongue attached to said body plate, a standard attached to said tongue, an ordinary handle attached to said tongue and said standard.

In testimony whereof I affix my signature in presence of two witnesses.

JAMES B. WHITE.

Witnesses:
 R. F. MARSH,
 J. F. MAY.

Copies of this patent may be obtained for five cents each, by addressing the "Commissioner of Patents, Washington, D. C."